United States Patent [19]

Phipps

[11] Patent Number: 5,417,629

[45] Date of Patent: May 23, 1995

[54] AXLE MOUNTING BICYCLE STAND AND CARRIER

[76] Inventor: Gary G. B. Phipps, P.O. Box 91339, West Vancouver, British Columbia, Canada, V7V 3N9

[21] Appl. No.: 881,219

[22] Filed: May 11, 1992

Related U.S. Application Data

[63] Continuation-in-part of Ser. No. 785,929, Oct. 31, 1991, abandoned.

[51] Int. Cl.$^6$ .................... A63B 21/00; B62H 1/04
[52] U.S. Cl. ................................ 482/61; 211/22
[58] Field of Search .............. 482/61; 224/31, 32 A; 211/5, 22

[56] References Cited

U.S. PATENT DOCUMENTS

| | | | |
|---|---|---|---|
| 3,352,426 | 11/1967 | Carlson | 211/22 |
| 3,572,758 | 3/1971 | Lee | 482/61 |
| 3,848,784 | 11/1974 | Shimano et al. | 211/22 |
| 3,931,919 | 1/1976 | Gerber et al. | 211/22 |
| 4,768,782 | 9/1988 | Blackburn | 482/61 |
| 4,941,651 | 7/1990 | Phillips | 482/61 |
| 5,026,047 | 6/1991 | Kosecoff | 482/61 |

Primary Examiner—Stephen R. Crow
Attorney, Agent, or Firm—Norman M. Cameron

[57] ABSTRACT

A bicycle stand includes a base and a pair of spaced-apart braces, each having a first end connected to the base and a second end. There is a pair of mounting members, each having a female threaded aperture which can threadedly receive a threaded outer portion of a bicycle axle. The second ends of the braces are pivotally connected to the mounting members. For example, the mounting members may be cylinders, the female threaded apertures extending axially inward from first ends thereof. Each of the braces has an aperture near the second end. The cylinders extend rotatably through the apertures. The base may have devices for mounting the stand on a roof rack of a vehicle including apertures in the base and tubular members having pins releasably engaging the apertures.

5 Claims, 2 Drawing Sheets

AXLE MOUNTING BICYCLE STAND AND CARRIER

RELATED APPLICATION

This application is a continuation-in-part of application Ser. No. 07/785,929 filed Oct. 31, 1991, now abandoned.

BACKGROUND OF THE INVENTION

1. Field of the Invention

This invention relates to combined bicycle stands and carriers and in particular to those having a base which can be rotated to a lower position below a bicycle wheel to function as a stand and to a position above the wheel to function as a carrier.

2. Description of Related Art

Many types of bicycle stands have been developed in the past. The most common is known as a "kick stand" and is usually clamped to a bicycle frame just behind the pedals. It includes a single support which can be rotated downwards by the foot to contact the ground and hold the bicycle upright at a slight angle from the vertical. While such stands are suitable for temporarily holding the bicycle on hard surfaces, they do not provide sufficient stability to hold the bicycle for long periods of time. In addition, they are not reliable when used on grass or soft ground.

Other stands have been developed in the past which include a support extending below the rear wheel of the bicycle to each side thereof and therefore provide better support. Often such stands are clamped to the bicycle frame. It is difficult to design such stands for universal application because the configurations of bicycle frames vary widely.

Attempts have also been made in the past to make bicycle stands which can also function as luggage carriers. An example is found in U.S. Pat. No. 3,572,758 to Lee which shows a device having a platform which can be rotated between a raised position, where it functions as a carrier, and a lower position where it functions as a stand for the bicycle. However, the device disclosed in Lee is relatively difficult to mount on some bicycles, particularly for bicycles with derailleur gears. The mounting system includes strap plates which are bolted to the bicycle frame. Apparently this requires holes to be drilled in the frame. This is not feasible for many bicycles where the holes would seriously weaken the frame.

Lee also discloses the use of the bicycle stand to convert the bicycle into a physical-exerciser device. Them are friction rollers on the platform which contact the bottom of the rear wheel of the bicycle when the device acts as a stand. This permits a person to pedal the bicycle and use it as an exercising bicycle.

Other attempts have been made to convert conventional bicycles into exercising bicycles as shown, for example, in U.S. Pat. No. 3,352,426 to Carlson.

SUMMARY OF THE INVENTION

It is an object of this invention to provide an improved combination bicycle carrier and stand which is relatively light in weight and which can easily be mounted on a bicycle without requiring the drilling of holes in the bicycle frame.

It is also an object of this invention to provide an improved combination bicycle stand and carrier which can be mounted on most common bicycles.

It is a further object of the invention to provide an improved combination bicycle stand and carrier which can easily be mounted on the roof rack of a vehicle to serve as a bicycle carrier.

In accordance with these objects, the invention provides a bicycle stand having a base and a pair of spaced-apart braces, said each brace having a first end connected to the base and a second end. There is a pair of mounting members, each said member having a female threaded aperture which can threadedly receive a threaded outer portion of a bicycle axle. The second ends of the braces are pivotally connected to the mounting members.

Each of the mounting members may be a cylinder. The female threaded aperture extends axially inwards from one end thereof. Each of the braces has an aperture near the second end thereof. The cylinders extend rotatably through the apertures.

The bicycle stand may also include means for releasably securing the braces in at least one pivotal position about the mounting members. The means may include apertures extending through the braces near the second ends thereof and through the cylinders. There are pins removably extending through the apertures.

The stand may also include means for mounting the stand on a roof rack. The means includes apertures in the base and tubular members having pins releasably engaging the apertures in the base.

DESCRIPTION OF THE PREFERRED EMBODIMENTS

Figure 2:
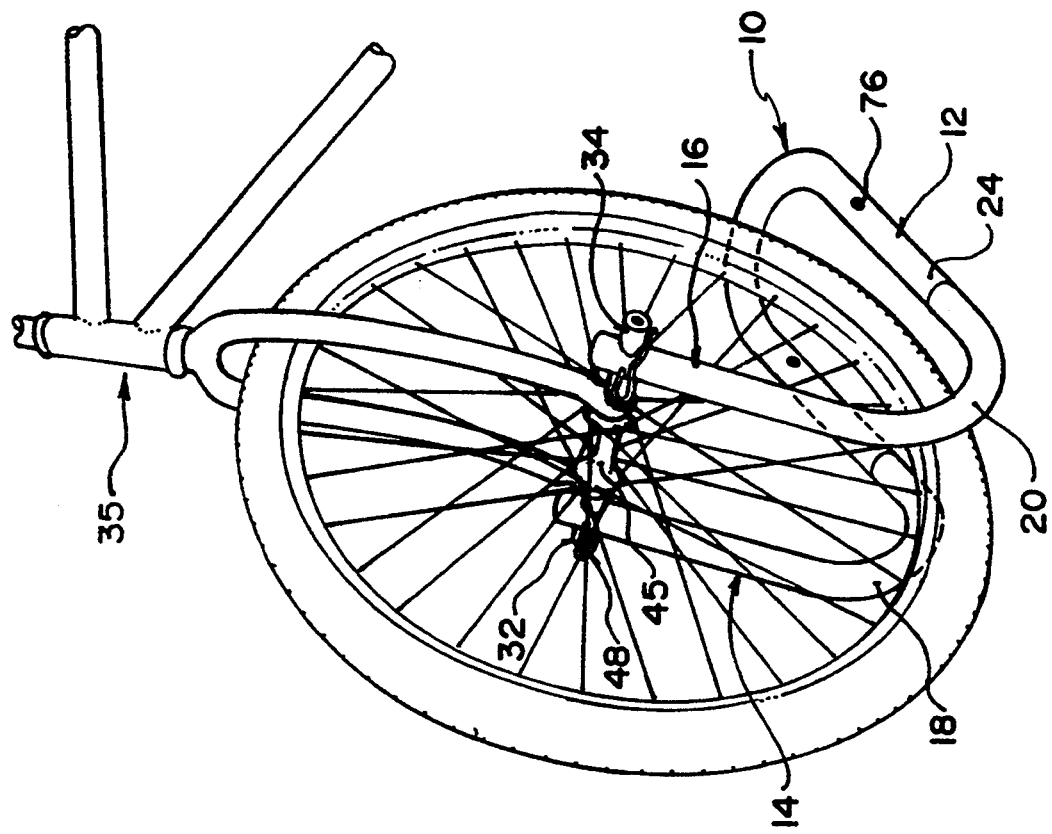
FIG. 2 is another perspective view of the combined bicycle stand and carrier shown mounted on the front axle of a bicycle, which is shown in fragment, the combined bicycle stand and carrier being shown in the lower position to function as a stand.
Figure 1:
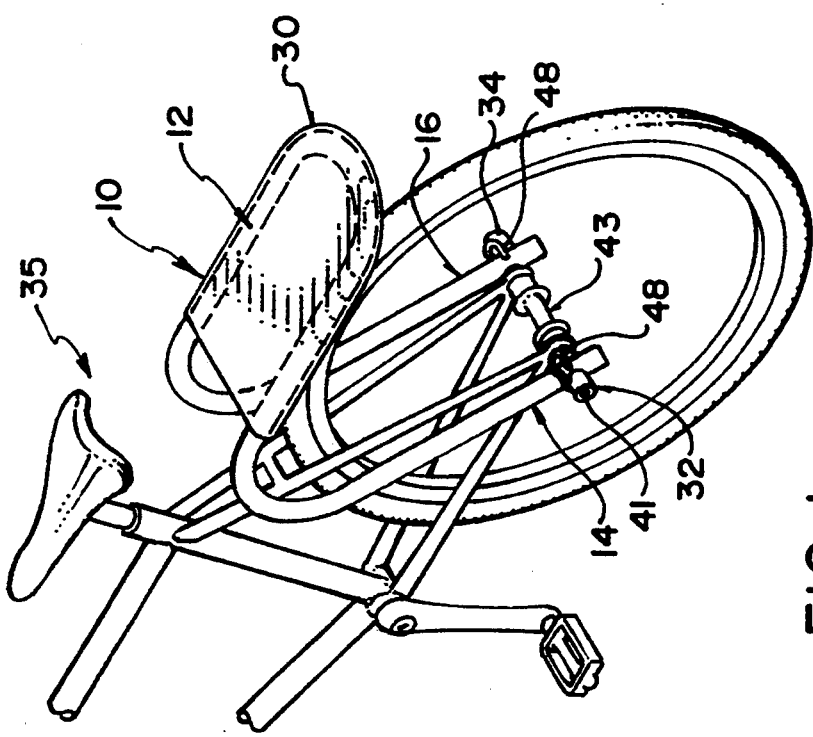
FIG. 1 is an isometric view of a combined bicycle stand and carrier according to an embodiment of the invention shown mounted on the rear axle of a bicycle which is shown in fragment, the combined stand and carrier being shown in a raised position to function as a carrier.
Figure 3:
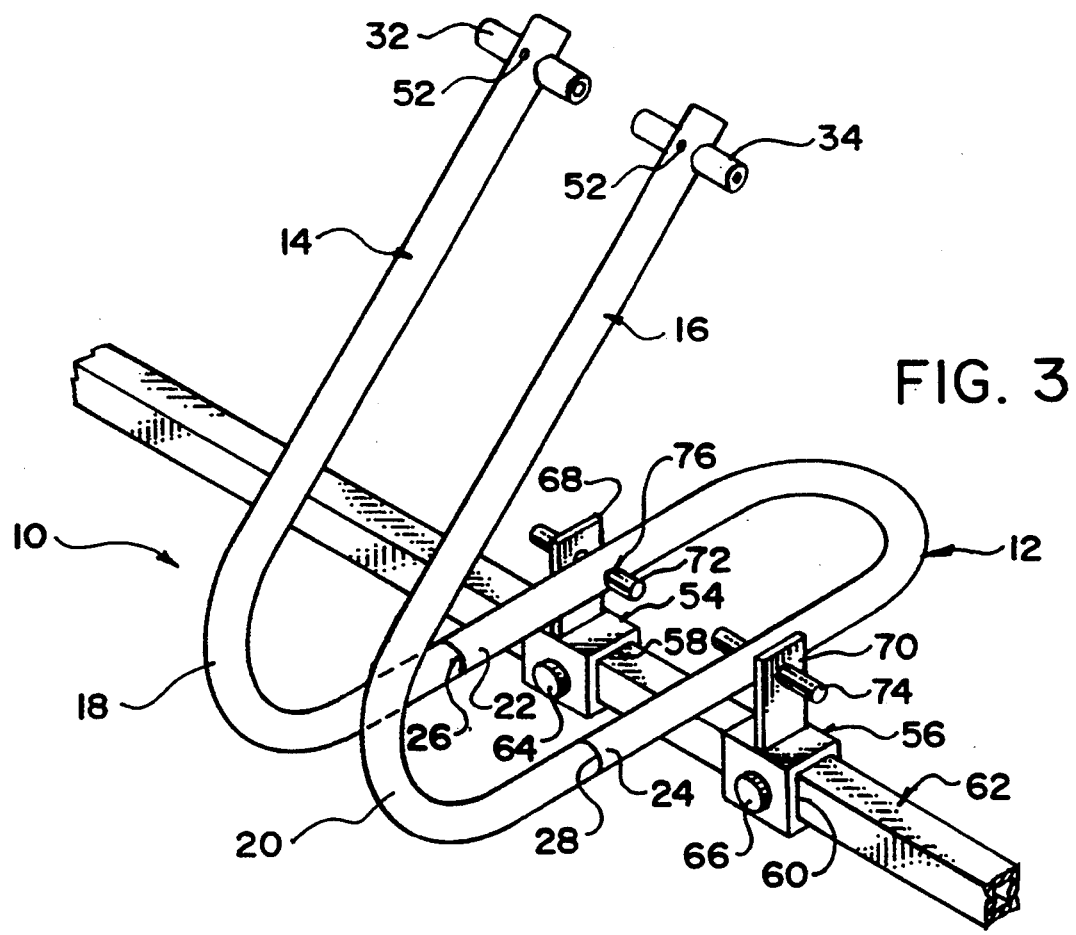
FIG. 3 is another perspective view of the combined bicycle stand and carrier shown mounted on the roof rack of a vehicle to function as a bicycle carrier.

FIGS. 1–3 show a combination bicycle stand and carrier 10 (the "stand") according to an embodiment of the invention. The stand includes a base 12 and a pair of braces 14 and 16. In this particular embodiment, the base and braces are of metal tubing and form a continuous member including a U-shaped portion forming the base, as best seen in FIGS. 2 and 3. The braces are parallel to each other and extend at an acute angle with respect to the base with curved connecting portions 18 and 20 between the braces and outer ends 22 and 24 of the base as best seen in FIG. 3. In this example there are joints 26 and 28 between the curved portions and the outer ends of the base which allow the stand to be knocked down for shipping.

A platform 30 is in the form of a U-shaped plastic sleeve which fits over the base, as seen only in FIG. 1, and is particularly useful when the stand is used as a carrier. The platform may be of other materials such as metal and can be connected to the braces in other ways.

Figure 4:
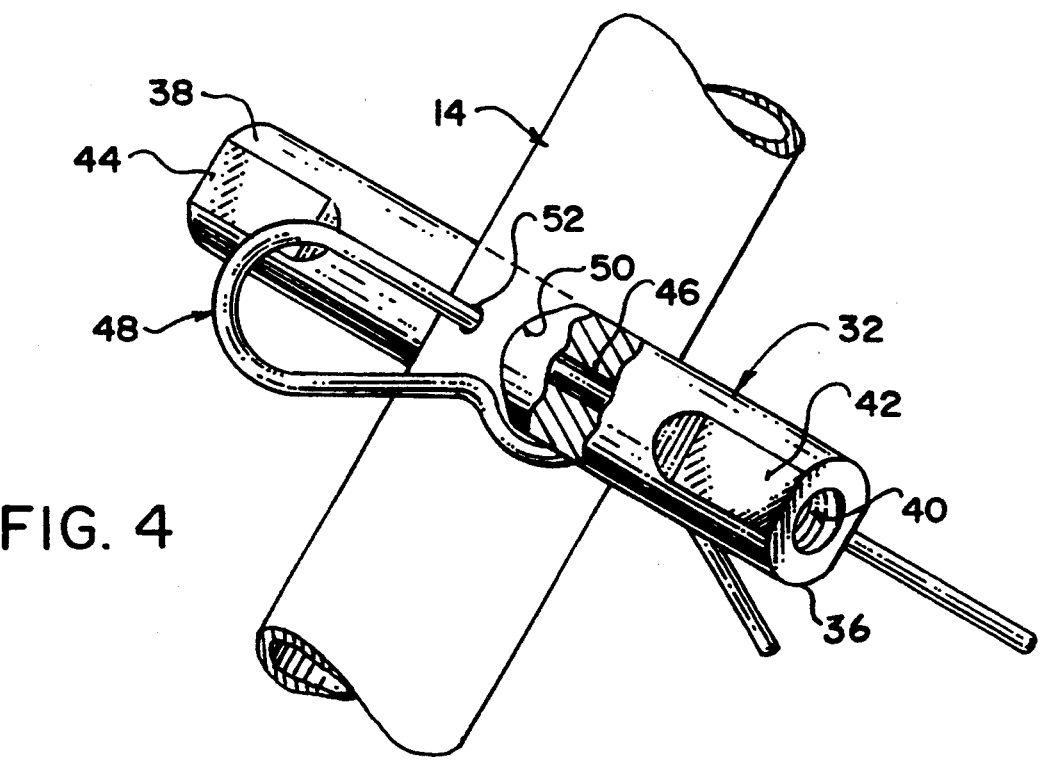
FIG. 4 is an enlarged, fragmentary perspective view of one of the mounting members thereof.

The stand includes a pair of members 32 and 34 which are used for mounting or connecting the stand to a bicycle 35 shown in fragment in FIGS. 1 and 2. As seen in better detail in FIG. 4, mounting member 32 is cylindrical with an inner end 36 and an outer end 38. There is a female threaded bore 40 which extends axially into the member 32 from its inner end 36. The size of the bore and the types of threads are configured to threadedly receive the male threaded outer members of bicycle axles 43 and 45 in place of the conventional nuts. The member is essentially symmetrical from end to end and end 38 is provided with a similar, but smaller female threaded bore 41, shown only in FIG. 1, for use on bicycles of the type having quick release hubs. For such bicycles the quick release mechanism is removed prior to installation of the members and replaced with a simple shaft having threaded outer ends which receive members 32 and 34 respectively.

The ends 36 and 38 of member 32 have flat portions 42 and 44 formed on each side of each end thereof which allows the member to be rotated with a wrench. There is an unthreaded bore 46 extending generally diametrically through the member near its center and perpendicular to its longitudinal axis and bore 40. This bore is for receiving a hitch pin clip 48 to hold the stand in the raised position of FIG. 1 or the lower position of FIG. 2. Other such bores can be provided through the member at different angular positions, for example at 90° to bore 46 if desired. This makes it easier to tighten the member in place on the bicycle axle with a bore in the correct angular position. Member 34 is the same as member 32 and therefore is not described in detail.

Each of the braces 14 and 16 has an aperture 50 therethrough near its outer end which is distal the base 12. This is best seen for brace 14 in FIG. 4. The members 32 and 34 fit through the apertures in the braces in a rotatable manner to permit pivoting of the stand from the raised position to the lower position and vice versa. There may be a plurality of spaced-apart such apertures 50 near the ends of each brace in order for the stand to fit bicycles having different diameter wheels.

There is a smaller bore 52 extending through each brace adjacent each aperture 50 and at right angles thereto. When properly aligned, the bore 52 and bore 46 in each member receive hitch pin clip 48 and serve as means for releasably securing the braces, and consequently the stand, in a desired pivotal position about the members 32 and 34. This is normally the raised position of FIG. 1 or the lower position FIG. 2.

Stand 10 also has means for mounting on a roof rack of a vehicle to serve as a bicycle carrier. This means is shown in FIG. 3 and includes a pair of sleeve-like clamp members 54 and 56. These members have openings 58 and 60 respectively which, in this example, are rectangular for fitting laterally extending bar 62 of a roof rack. The members have thumb screws 64 and 66 which serve as means for releasably holding the sleeve-like members in fixed positions along the bar 62.

The members have upstanding flanges 68 and 70 having pins 72 and 74 which extend parallel to bar 62. When in use, the pins extend through apertures 76 (only one shown) on each side of base 12 of the stand. The outer ends of the stands can be used for adjacent stands so that the vehicle can carry more than one bicycle.

Operation

The stand is installed by first removing the nuts on either the front axle or the rear axle of a bicycle. This stand is unique in fitting either axle. After the nuts are removed, the members 32 and 34 are threaded onto the outer ends of the axle finger tight. The apertures 50 in braces 14 and 16 are then fitted over the members. The base and braces are rotated about the members until bore 52 on one brace aligns with bore 46 through the corresponding member 32 or 34. Hitch pin clip 48 is then installed on that side. The base and braces can then be rotated to tighten the member 32 or 34 on the side where the hitch pin clip is installed. The clip can be removed, and the base freely rotated 180° and then the pin replaced to tighten the member 32 or 34 sufficiently. The rotation is stopped when the stand is either at the raised position of FIG. 1 or the lower position of FIG. 2. The clip can then be removed and installed on the other side and the same process is repeated.

After the members have been tightened, the clips 48 on each side can be inserted to maintain the raised position of FIG. 1 where the stand functions as a carrier. Goods can be placed on top of platform 30 and held in place by bungy cords or the like.

In order to function as a stand, the clips are removed and the base is rotated to the position of FIG. 2 where the clips are reinstalled.

When the stand is installed on the rear wheel of the bicycle, as shown in FIG. 1, it can function to convert the bicycle into an exercising bicycle when the stand is lowered. The rear wheel is held then off the ground. Friction can be applied using the rear hand brake of the bicycle.

The stand is also useful for adjusting the spokes of the bicycle, adjusting gears and the like because it holds the wheel completely off the ground for free rotation.

When used as a bicycle carrier for vehicles, as seen in FIG. 3, the bicycle with the stand in the lower position is placed in the standing position on top of the vehicle with the base 12 between members 54 and 56 with their thumb screws loosened. The members are then moved towards the stand so that pins 72 and 74 enter openings 76 in the base 12. The thumb screws 64 and 66 are then tightened.

It will be understood by someone skilled in the art that many of the details provided above are by way of example only and are not meant to limit the scope of the invention which is to be interpreted with reference to the following claims.

What is claimed is:

1. A bicycle stand, comprising:
   a base;
   a pair of spaced-apart braces, each said brace having a first end connected to the base and a second end;
   a pair of mounting members, each said member having means for threadedly receiving a threaded outer member of a bicycle axle, said means for threadedly receiving including a female threaded first aperture, the second ends of the braces being pivotally connected to the mounting members, each said mounting member being a cylinder, the female threaded first aperture extending axially inwards from one end thereof, each of the braces having a first aperture near the second end thereof, the cylinders extending rotatably through the first apertures in the braces; and means for releasably securing the braces in at least one pivotal position about the mounting members including second apertures extending through the braces near the second ends thereof, second apertures through the cylinders, and pins removably extending through the second apertures in the braces and cylinders, the second apertures in the braces and the cylinders being perpendicular to the first apertures.

2. A bicycle stand, comprising:

a base having means the mounting the stand on a roof rack of a vehicle, the means including clamp members and means the releasably engaging the clamp members with the base, the clamp members having rectangular openings, the means for releasably engaging including pins on the clamp members and apertures in the base;

a pair of spaced-apart braces, each said brace having a first end connected to the base and a second end; and a pair of mounting members, each said member having means for threadedly receiving a threaded outer member of a bicycle axle, said means for threadedly receiving including a female threaded first aperture, the second ends of the braces being pivotally connected to the mounting members, each said mounting member being a cylinder, the female threaded first aperture extending axially inwards from one end thereof, each of the braces having a first aperture near the second end thereof, the cylinders extending rotatably through the first apertures in the braces: and means for releasably securing the braces in at least one pivotal position about the mounting members.

3. A combination bicycle stand and carrier comprising:

a platform:

a pair of spaced-apart braces, each said brace having a first end connected to the platform, a second end and a first aperture near the second end thereof; and a pair of mounting members, each said member having means for threadedly receiving a threaded outer member of a bicycle axle, said means for threadedly receiving including a female threaded first aperture, the second ends of the braces being connected to the mounting members and being pivotal 180° thereabout between an upper position where the platform serves as a bicycle carrier and a lower position where the combination serves as a bicycle stand, each said mounting member being a cylinder, the female threaded first aperture extending axially inwards from one end thereof, the cylinders extending rotatably through the first apertures in the braces; and means for releasably securing the braces in each of said positions, the means for releasably securing comprising second apertures extending through the braces near the second ends thereof and second apertures through the cylinders, the second apertures through the braces and the cylinders being perpendicular to the first apertures respectively, and pins removably extending through the second apertures in the braces and cylinders.

4. In combination:

a bicycle having front and rear axles, each said axle having male threaded members at each end thereof;

a combined bicycle stand and carrier mounted on one said axle, having a platform, a pair of spaced-apart braces extending from the platform with outer ends, connectors threadedly engaging the male threaded members of said one axle, the braces being pivotally mounted on the connectors near the outer ends of the braces, the connectors being cylinders, each having a female threaded axial bore threadedly received on one of the male threaded members of said one axle, each of the braces having a first aperture rotatably received over one of the cylinders; and means for selectively securing the combination bicycle stand and carrier in the lower position or the raised position, the means for selectively securing including second apertures extending through the braces and second apertures through the connectors perpendicular to the first apertures and the axial bores respectively, one set of second apertures in the braces and the connectors being aligned when the combination bicycle stand and carrier is in the lower position mad one set of second apertures being aligned when in the raised position, mad a pin selectively insertable into each said set of second apertures.

5. In combination:

a bicycle having front and rear axles, each said axle having male threaded member at each end thereof;

a combined bicycle stand and carrier mounted on one said axle, having a platform, a pair of spaced-apart braces extending from the platform with outer ends, connectors threadedly engaging the male threaded members of said one axle, the braces being pivotally mounted on the connectors near the outer ends of the braces, the connectors being cylinders, each having a female threaded axial bore threadedly received on one of the male threaded members of said one axle, each of the braces having a first aperture rotatably received over one of the cylinders; and means for mounting the bicycle on a roof rack of a vehicle which has a laterally extending bar, the means for mounting including apertures in the platform, a pair of clamp members having openings fitting over the bar, pins insertable into the apertures of the platform and means for releasably holding the clamp members in fixed positions along the bar.

* * * * *